United States Patent [19]
McCormick

[11] Patent Number: 6,026,682
[45] Date of Patent: *Feb. 22, 2000

[54] COOLANT SAFETY SYSTEM FOR AUTOMATED WELDING APPARATUS

[75] Inventor: Peter E. McCormick, Dallas, Tex.

[73] Assignee: EOA Systems, Incorporated, Dallas, Tex.

[*] Notice: This patent is subject to a terminal disclaimer.

[21] Appl. No.: 09/104,507

[22] Filed: Jun. 25, 1998

Related U.S. Application Data

[63] Continuation-in-part of application No. 08/886,770, Jul. 2, 1997, Pat. No. 5,811,674, which is a continuation of application No. 08/557,835, Nov. 14, 1995, abandoned.

[51] Int. Cl.[7] .................................................. G01F 7/00
[52] U.S. Cl. ........................... 73/196; 73/197; 73/861.44
[58] Field of Search ............................. 73/196, 197, 850, 73/198, 195, 861.44, 40, 40.5

[56] References Cited

U.S. PATENT DOCUMENTS

| | | |
|---|---|---|
| 3,667,285 | 6/1972 | Wright et al. . |
| 3,711,689 | 1/1973 | Park . |
| 3,723,987 | 3/1973 | Barone, Jr. et al. . |
| 3,888,405 | 6/1975 | Jones et al. ............................... 228/2.3 |
| 3,987,662 | 10/1976 | Hara et al. . |
| 4,104,724 | 8/1978 | Dix et al. ........................... 364/477.06 |
| 4,118,780 | 10/1978 | Hirano ....................................... 702/45 |
| 4,633,213 | 12/1986 | Venema . |
| 5,310,114 | 5/1994 | Cann . |
| 5,719,367 | 2/1998 | Young .................................. 219/86.31 |
| 5,811,674 | 9/1998 | McCormick .............................. 73/196 |
| 5,829,470 | 11/1998 | Yowell et al. . |

FOREIGN PATENT DOCUMENTS

| | | | |
|---|---|---|---|
| 06015460 | 1/1994 | Japan ............................. | B23K 11/36 |

*Primary Examiner*—Max Noori
*Attorney, Agent, or Firm*—Dinnin & Dunn, P.C.

[57] ABSTRACT

In an automated welding machine, where a flow of liquid coolant is supplied to welding components on the machine from a source of coolant and then returned to the source of coolant, a safety system is provided that shuts down the flow of coolant in the event of a fault. Faults are detected by a supply sensor and a return sensor for measuring the flow rates of coolant in the supply and return lines. A microprocessor is adapted to compare the supply flow rate and return flow rate and detect differences between the two rates. The difference between the detected rates as compared to a leak threshold value, and the microprocessor is adapted to generate a valve shutoff signal in the event the detected difference in flow rates exceeds the leak threshold value. A value in the supply coolant line is responsive to the valve shutoff signal to shutoff flow of coolant in response thereto.

19 Claims, 14 Drawing Sheets

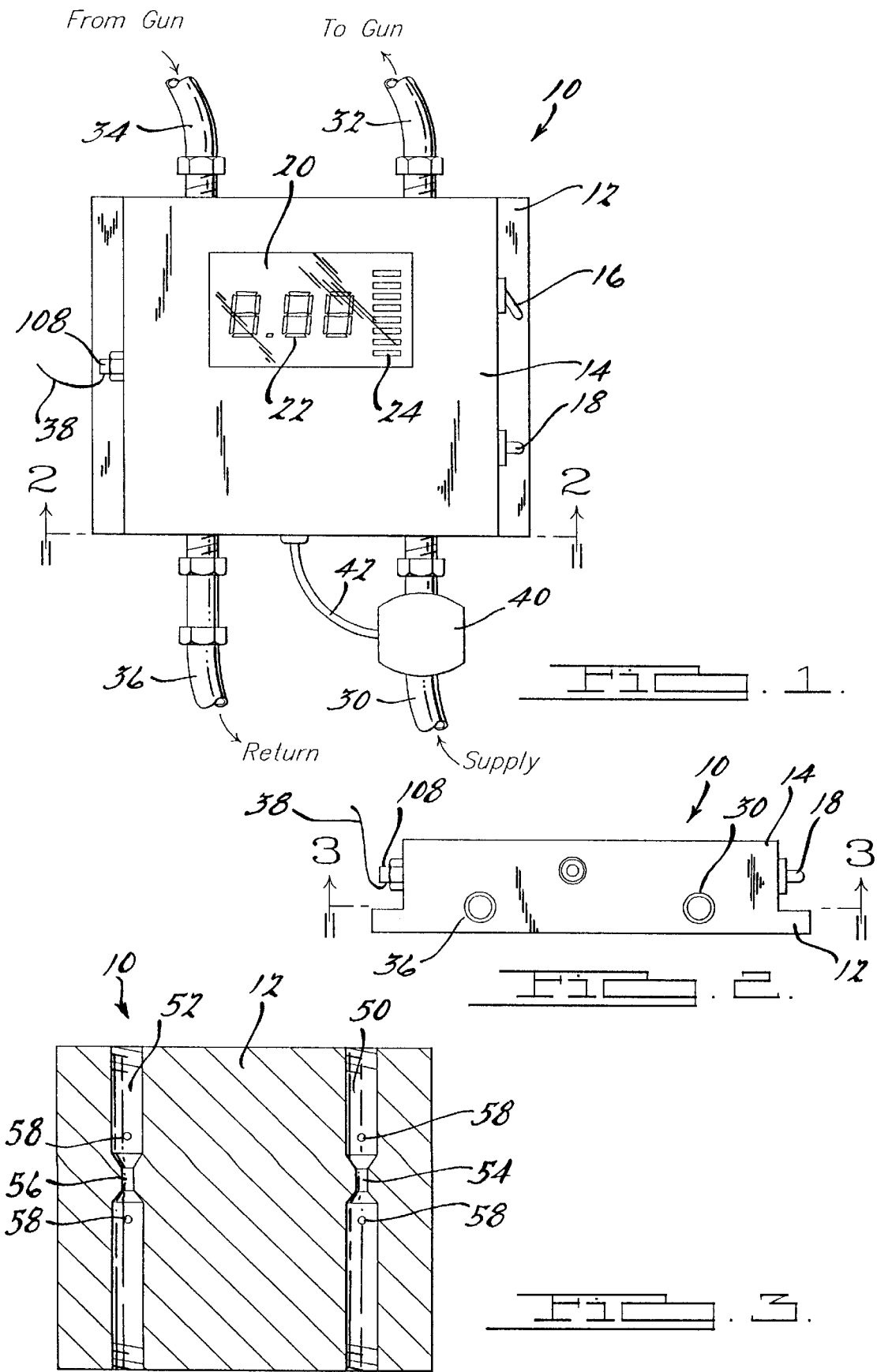

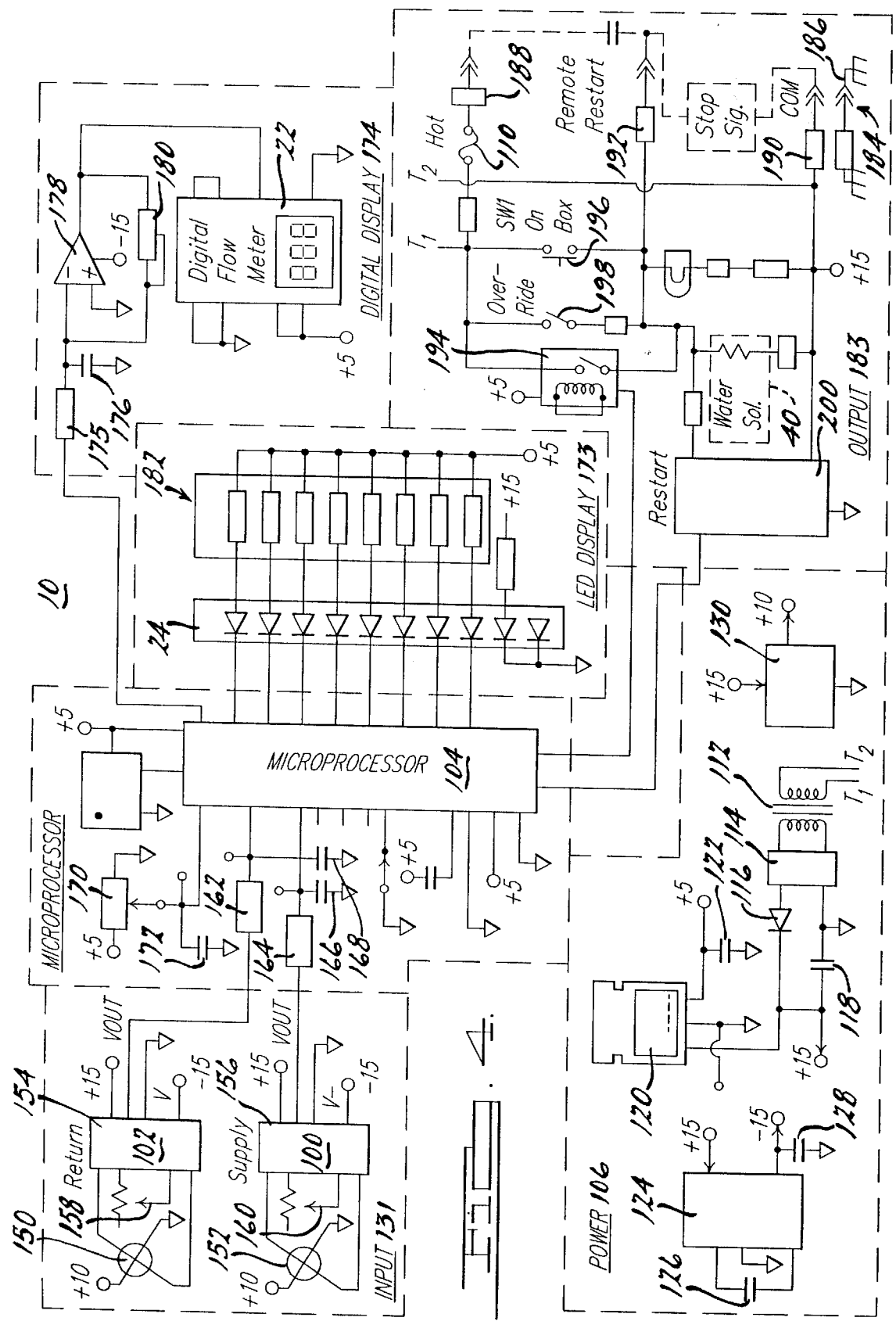

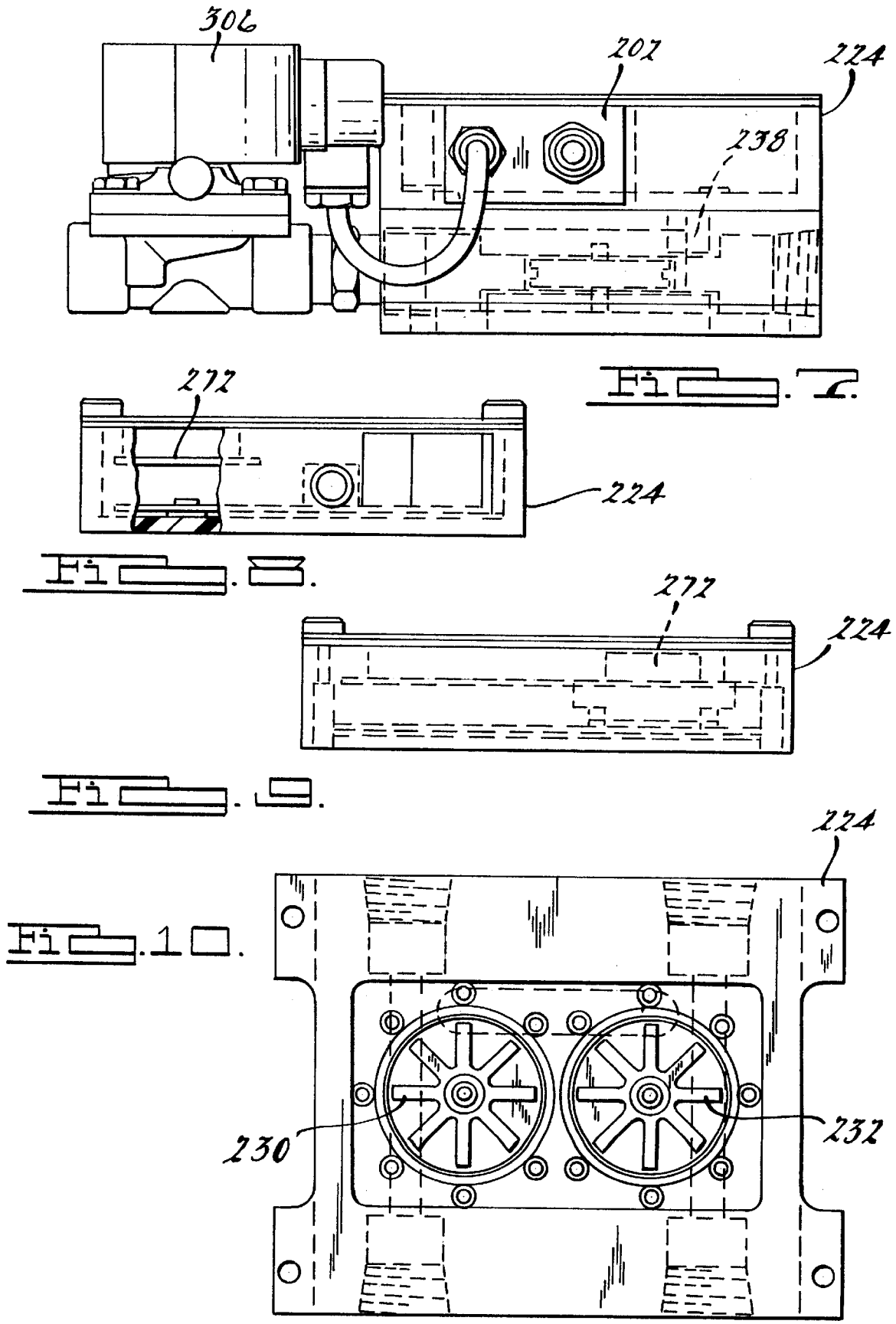

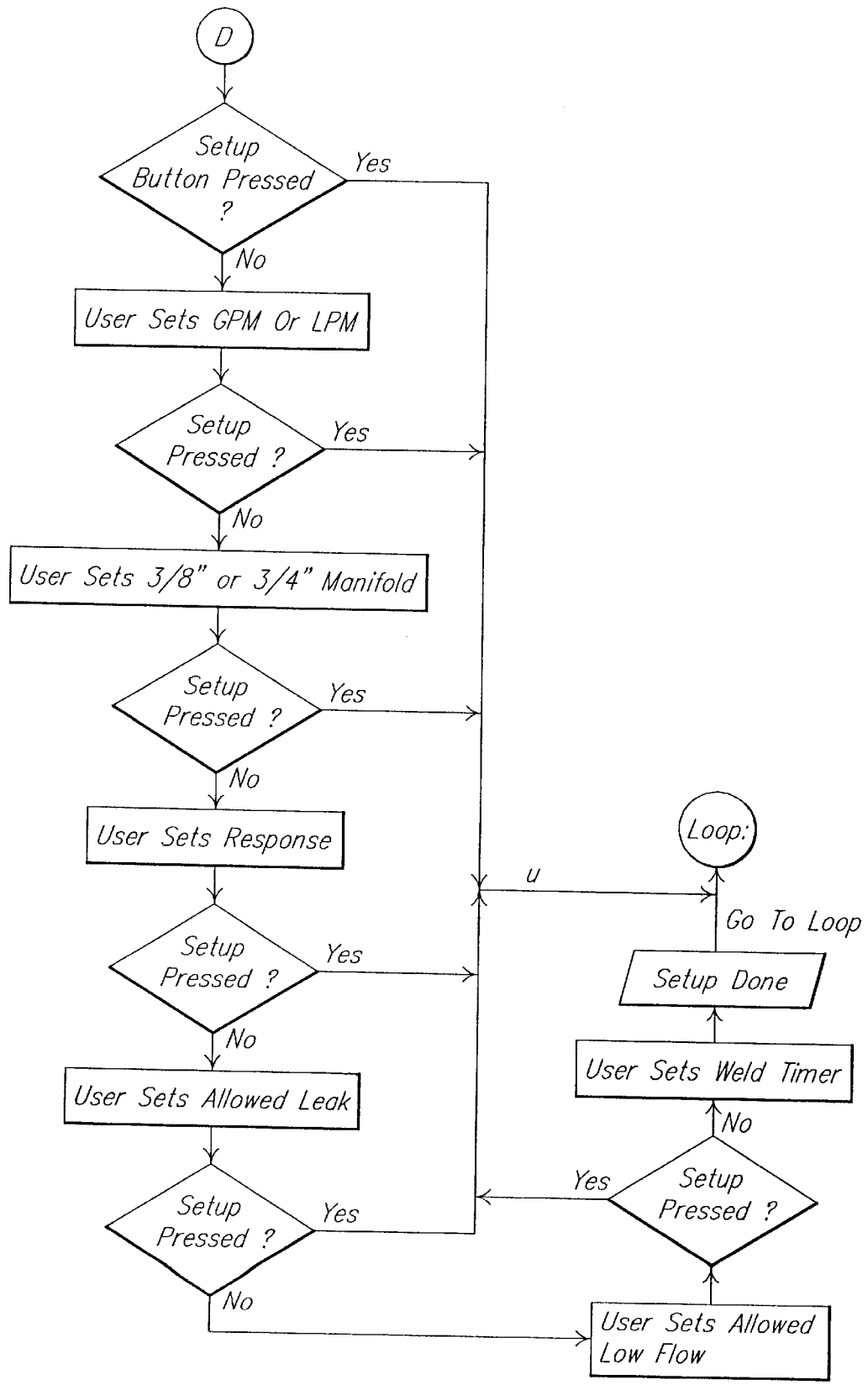
FIG. 1B E.

COOLANT SAFETY SYSTEM FOR AUTOMATED WELDING APPARATUS

This application is a continuation in part of prior application Ser. No. 08/886,770 filed Jul. 2, 1997, now U.S. Pat. No. 5,811,674 which latter application is a continuation of application Ser. No. 08/557,835 filed Nov. 14, 1995, now abandoned.

TECHNICAL FIELD

This invention relates to automated welding apparatus, and more particularly to a device to detect coolant leakage and automatically shut off a coolant supply valve in response thereto.

BACKGROUND ART

Automated welding systems, either "hard" automated systems or robotic arms fitted with welding end-of-arm units, are now in common use in many types of manufacturing. The heat generated by automated welding systems is sufficiently great that a source of forced cooling is required. Typically, automated welding units are liquid-cooled, with coolant (typically water) being supplied from a source of pressurized coolant remote from the welding unit. In many installations, a large number of automated welding machines are plumbed to a common source of coolant liquid under pressure.

The typical coolant flow through an automated spot-welding gun, a common variant, is about six gallons per minute. The SCR weld control is typically supplied 1–2 gpm, the weld gun upper tip 1.5 gpm, weld gun lower tip 1.5 gpm, the shunts 1 gpm, and the cable 1.5 gpm. The usage of a liquid coolant with high-powered electrical equipment necessitates some sort of safety system to detect coolant leakage in the event of broken coolant lines or other failures in the coolant system. In addition, it is desirable to detect either excessive flow or insufficient flow conditions. An excessive flow condition can mean that coolant supply pressure has exceeded its design level or that a necessary restriction within the cooling system has been removed. Similarly, an insufficient flow condition can indicate a failure of the coolant supply or a general blockage of the coolant supply or return lines.

Present solutions to the requirement of sensing and monitoring coolant flow in automated welding arms have used complicated and expensive mechanical leakage detection devices. For example, a water control valve manufactured by Norco of Troy, Mich. relies on a complicated spool valve having opposed surfaces on opposite sides of the flow circuit to sense pressure imbalances. Numerous o-rings, diaphragms and moving parts make reliable operation of this device as questionable as the proper operation of the cooling system it is designed to protect. Thus, in addition to the expense of such a system, there are concerns about the maintenance and reliability of the prior art safety systems.

Thus, there presently exists a need for a coolant safety system for an automated welding machine that is simple, inexpensive and reliable with minimal maintenance requirements. Furthermore, there is a need for coolant safety system for an automated welding machine that includes an auxiliary sensor on board, a multi gun unit, and an easily programmable unit for different welding applications.

SUMMARY OF THE INVENTION

The present invention provides a coolant system safety device for an automated welding machine that combines electronic control by way of a microprocessor with flow level and leakage detection provided by inexpensive yet reliable differential pressure transmitters. An integral digital flow rate display is also provided.

BRIEF DESCRIPTION OF THE DRAWINGS

A more complete understanding of the invention and its advantages will be apparent from the Detailed Description taken in conjunction with the accompanying Drawings, in which:

FIG. 1 is a top view of an apparatus constructed in accordance with the invention;

FIG. 2 is a sectional view taken along lines 2—2 of FIG. 1;

FIG. 3 is a sectional view taken along lines 3—3 of FIG. 2;

FIG. 4 is a circuit schematic;

FIG. 7 is a side view of the alternate embodiment;

FIG. 8 is a partial cross section of the alternate embodiment;

FIG. 9 is a side view of the alternate embodiment;

FIG. 10 is a bottom view of the alternate embodiment;

DETAILED DESCRIPTION OF THE PREFERRED EMBODIMENT

Figure 5:
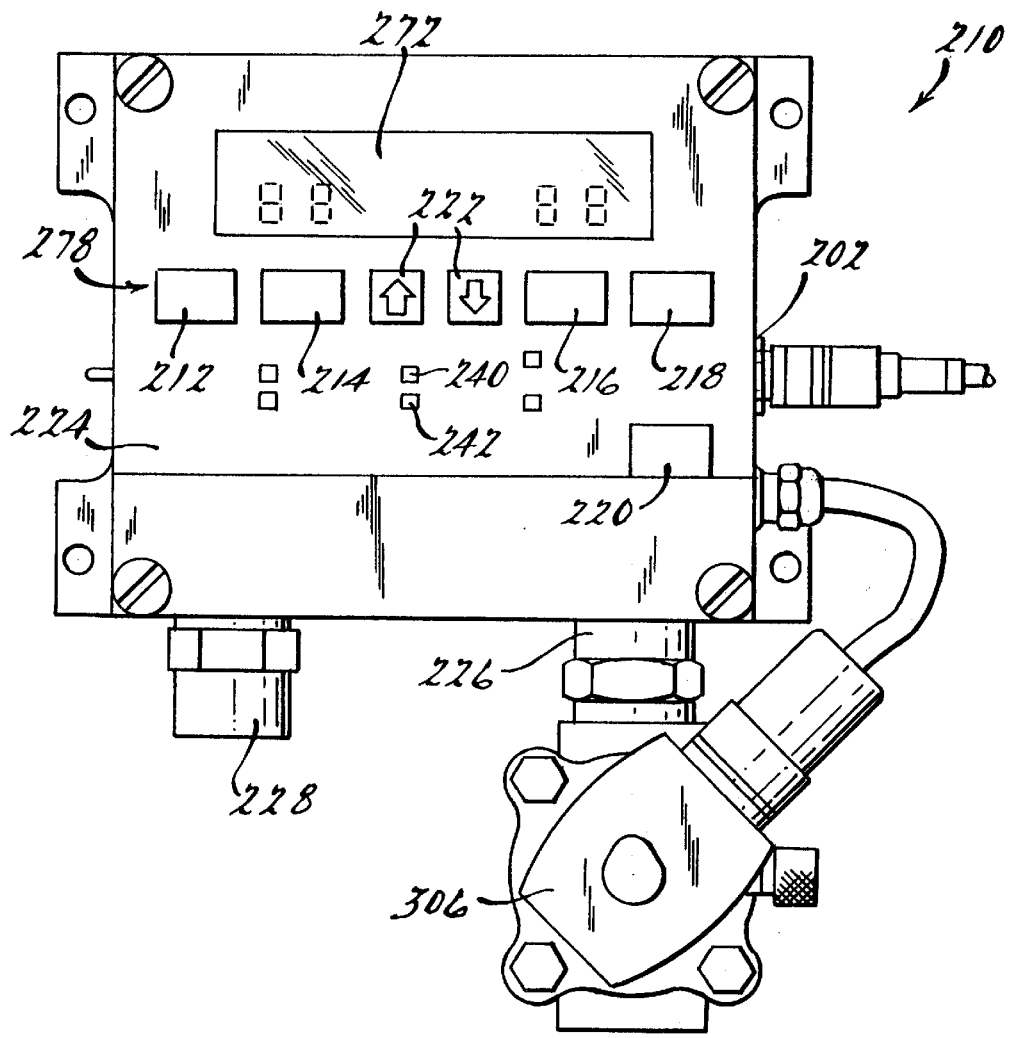
FIG. 5 is a top view of an alternate embodiment constructed in accordance with the invention.
Figure 6:
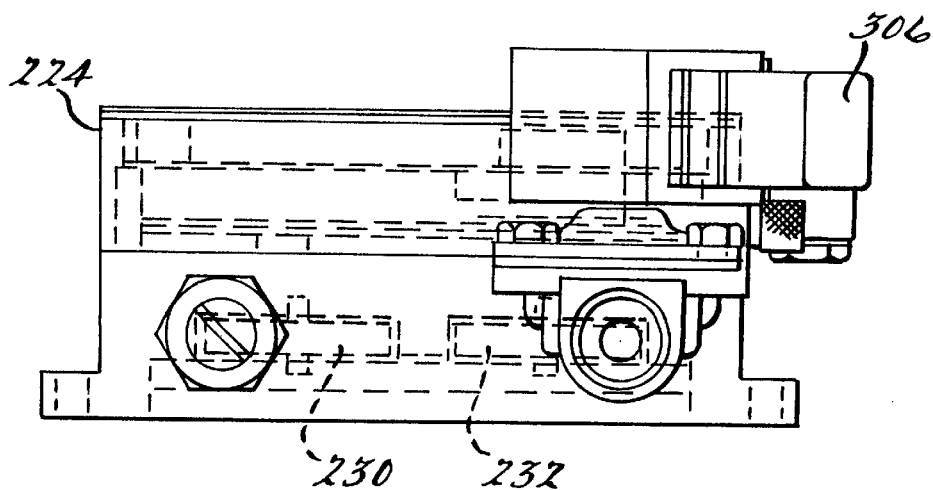
FIG. 6 is a side view in detail of the alternate embodiment.
Figure 11:
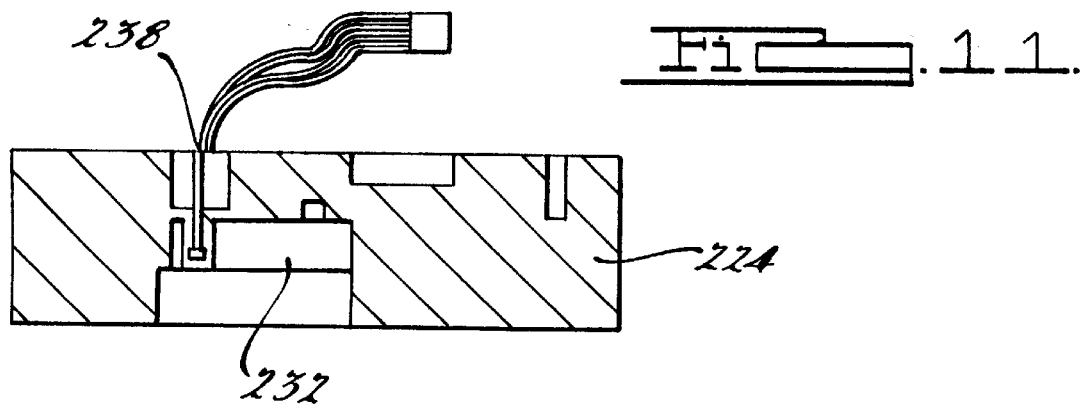
FIG. 11 is a cross section taken along line A—A of FIG. 10.
Figure 12:
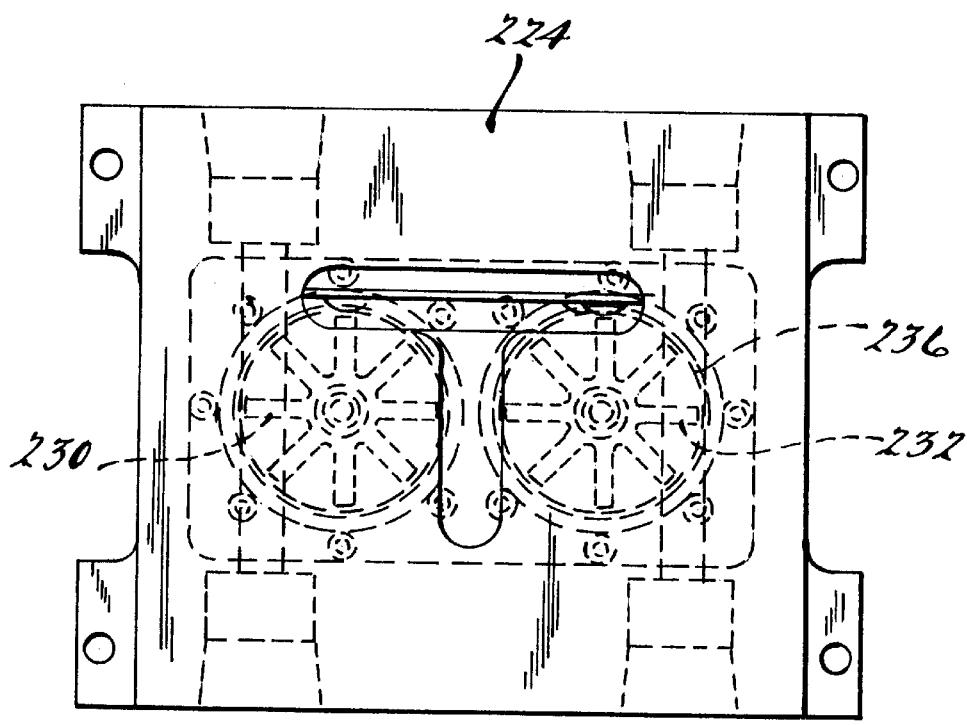
FIG. 12 is a sectional view of the bottom of the alternate embodiment.
Figure 13:
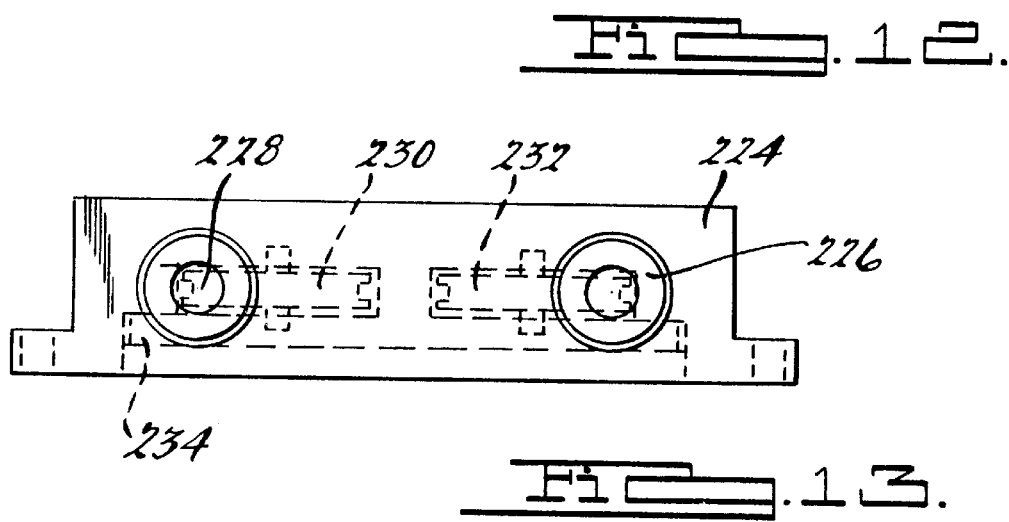
FIG. 13 is a side view of the alternate embodiment.
Figure 14:
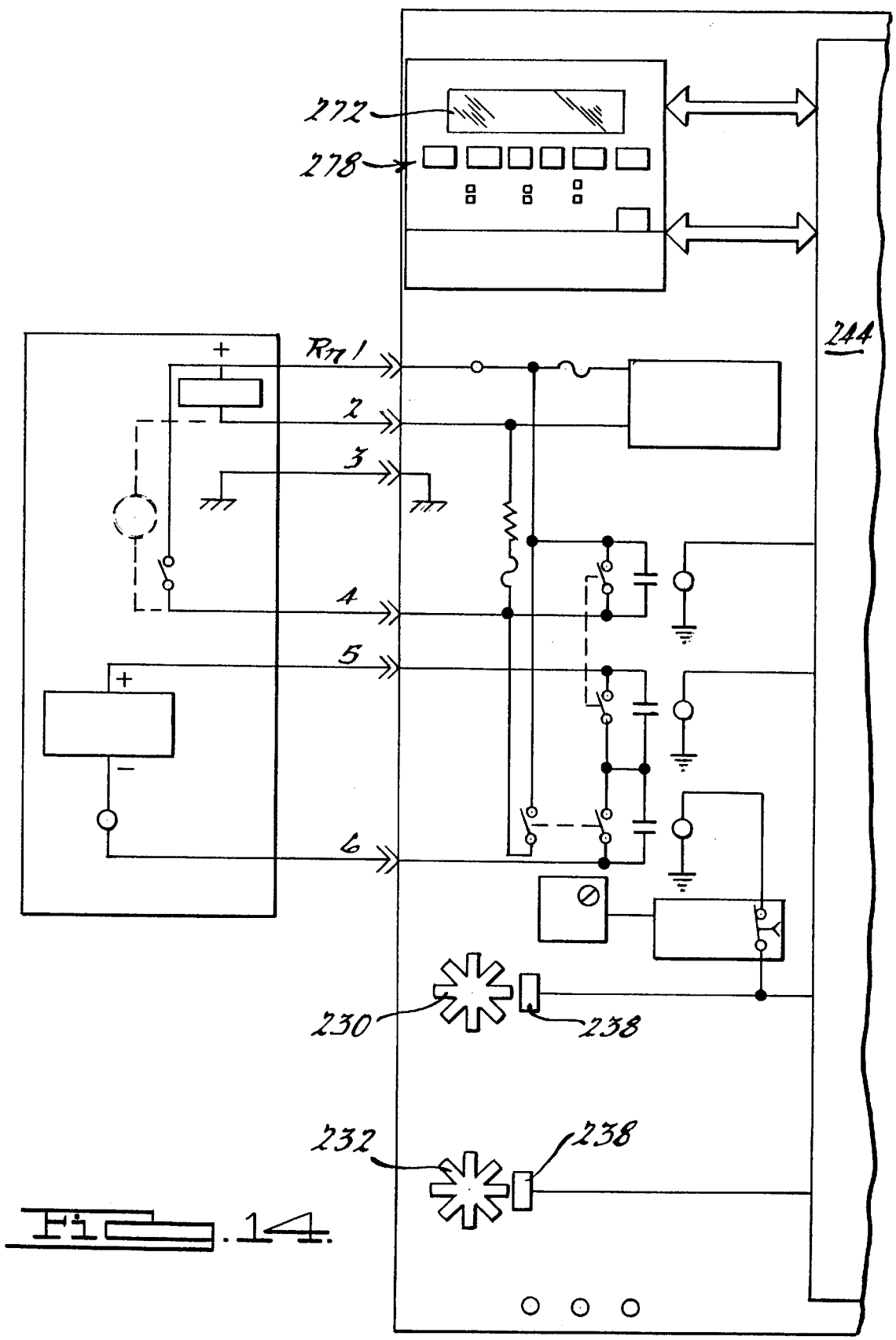
FIG. 14 is a circuit schematic.

Referring initially to FIGS. 1–3, where like numerals refer to like and corresponding elements, safety system 10 includes a manifold 12 and an electronic module housing 14. A toggle switch 16 and a push button switch 18 extend from a side surface of housing 14. LED display 20 includes a three-digit numerical display 22 and an array 24 of single LEDs. The following description is applicable to a safety system in a robotic environment, but persons skilled in the art that the system is usable in "hard" automated systems with minor modifications.

Four coolant lines connect to manifold 12: coolant supply line 30, welding gun supply line 32, welding gun return line 34, and coolant return line 36. An electrical control cable 38 is plugged into a side of housing 14. Solenoid valve 40 is located in coolant supply line 30 close to system 10. A control cable 42 connects housing 14 and valve 40.

As best shown in FIG. 3, manifold 12 is machined to include a supply passageway 50 and a return passageway 52. Each passageway 50, 52 has an identically-sized orifice 54, 56, respectively. A port 58 is drilled into each side of orifices 54, 56 for a total of four ports 58. As will be known to one skilled in the art, the provision of a port 58 on each side of orifices 54 and 56 enables the precise measurement of differential pressure across the orifices 54, 56. Differential pressure across an orifice is a direct function of flow rate.

Referring now to FIG. 4, safety system 10 measures the flow of water to and from the device being cooled, in this case an automated welding gun, using two differential pressure flow sensors 100, 102 that are constantly monitored by a microprocessor 104. In the preferred embodiment coolant will be shut-off via electric solenoid valve 40 if one or more of the following conditions are met (all values may be adjusted in software or by gain pots):

1. Flow exceeds approximately 7 g.p.m.;
2. Flow is below approximately 1 g.p.m.; or
3. Flow difference is greater than 0.5 g.p.m.

Power module 106 receives 120 VAC power or optional 24 VDC (through cable 38 and connector 108, FIGS. 1 and 2) through fuse 110 and transformer 112. Transformer 112 has two input leads $T_1$ and $T_2$. Transformer 112 is bypassed using jumpers if the application requires 24 VDC. The voltage is transformed to 20 VAC in transformer 112 and is fed into a full wave bridge rectifier 114. Diode 116 insures against reverse polarity. The rectified power is filtered into DC using capacitor 118 to generate 15 VDC. This power is used for the 15 VDC supplied to the op amps described below. 15 VDC is also regulated down to 5 VDC using regulator 120. Capacitor 122 provides additional filtering of the 5 VDC power. 15 VDC is fed to voltage inverter 124. Inverter 124 periodically charges capacitor 126, then uses the equivalent of an internal double pole switch to rapidly place capacitor 126's inverted voltage into capacitor 128. The voltage on capacitor 128 is therefore negative with respect to ground to provide the minus 15 VDC supply to the op amps described below. 15 VDC is also supplied to regulator 130 to regulate and supply the extremely stable and precise 10.000 volts for flow sensors 100,102. Regulator 130 in the preferred embodiment is a Harris voltage inverter Model No. ICL7662CPA.

The input module 131 of the circuit has the primary function of measuring the return and supply flow by way of sensors 100,102. In the preferred embodiment, differential pressure sensors are used in preference to other available methods for measuring flow. One alternative method of measuring flow, for example, uses the calorimetric principle, or the measure of heat transfer from an object to a fluid. This method, while highly accurate, is not preferred due to its prohibitive costs. Additional methods employ ultrasonic, vane, and impeller techniques for measuring flow. It will be recognized that these alternative methods are equivalent to the preferred method, though more costly.

Water flowing through an orifice normally follows the equation $Q=C_v\sqrt{(P_{in}-P_{out})}$. Q is flow in gallons per minute, $C_v$ is a constant, $P_{in}$ is the pressure before the orifice and $P_{out}$ is the pressure after the orifice. Referring to FIG. 3, as well as FIG. 4, pressure sensors 150 and 152 each have two hose attachments which plumb into ports 58 in flow manifold 12. In flow manifold 12, passageways 50, 52 preferably have a mean diameter of 0.74 inches and an orifice 54, 56 diameter of 0.375 inches. Differential pressure is applied to opposing sides of a diaphragm within sensors 150, 152 that has an "X" etched into the surface. Excitation current is passed longitudinally through the diaphragm, and the pressure that stresses the diaphragm is applied at a right angle to the current flow. The stress establishes a transverse electric field in the diaphragm, acting as a resistor, that is sensed as a voltage at the midpoint at the resistor. The single element transverse voltage strain gauge of sensors 150, 152 can be viewed as the mechanical analog of a Hall effect device. The device is temperature, gain, and zero compensated. In the preferred embodiment, the differential pressure sensors 150, 152 are each a model no. MPX2010D manufactured by Motorola.

A full flow differential pressure of no more than 1.5 psi results in a signal of 0.025 V on the output of sensors 150, 152. This small voltage is amplified in instrumentation op amps 154, 156. Instrumentation op amps 154, 156 are each a model no. INA114BP manufactured by Burr Brown. Gain is adjusted on resistors 158, 160 so that the amps 154, 156 output the same voltage when the flows are the same. The output of the amps 154, 156 are low pass filtered for inherent slight cavitation pressure spikes in manifold 12 using resistors 162, 164 and capacitors 166, 168. The filtered 0–5 VDC raw voltages from the amps 154, 156 are fed to microprocessor 104 for interpretation.

The microprocessor module 157 for the system uses a microprocessor 104, because it eliminates a much more complex hard-wired circuit and may be easily altered in software. Microprocessor 104 has internal ram/rom, several eight-bit analog inputs, the ability to output variable duty cycle square waves, and discreet inputs and outputs. In the preferred embodiment, microprocessor 104 is a Signetics model no. S87C752-IN28.

Since $Q=C_v\sqrt{(P_{in}-P_{out})}$ and $C_v$ is only important when scaling Q to units (English, Metric, etc) the constant $C_v$ is ignored for now. The supply $P_{in}-P_{out}$ is the voltage from sensor 152 and op amp 156. The return $P_{in}-P_{out}$ is the voltage from sensor 150 and op amp 154. Microprocessor 104 uses a look-up square root table twice to determine supply flow(S) and return flow (R). The difference in flow is S–R. A user-settable threshold trimpot 170 is stabilized by capacitor 172 and is fed directly to microprocessor 104 on an analog channel and compared with S–R. Coolant will be shut-off if the flow difference threshold is exceeded for a full two seconds. (S–R>T). Likewise flow is shut-off if flow exceeds approximately 7 g.p.m. (S or R>7 g.p.m.) or is lower than 1 g.p.m. (S or R<1 g.p.m.).

Microprocessor 104 includes a digital output port, which is used to directly drive LED display 24 in module 173 to keep the user informed of the system's status. The indicator lights in display 24 are a row of LEDs driven directly by the microprocessor 104. Dropping resistors 182 limit the drive current.

Microprocessor 104 also uses its variable duty cycle square wave PWM capability to notify the user of the actual flow rate using digital numeral display 22 in module 174. The PWM cycles at 20 Khz. As flow changes, the duty cycle changes. The 20 Khz is filtered to a DC level using a low pass filter comprised of resistor 175 and capacitor 176. Op amp 178 provides the Cv in the equation $Q=Cv\sqrt{(P_{in}-P_{out})}$ to convert volts to a scaled, meaningful flow rate on the display 22. Resistor 180 is provided to adjust the amp gain to display Cv during factory calibration.

Digital display meter 22 provides the user with actual gallons per minute from both sensors 150, 152. Microprocessor 104 periodically changes between the supply and return flow data going to display 22. Indicator lights in LED display 24 tell the user which sensor the digital display 22 is currently reporting. The digital display is preferably a self-contained volt meter with 0–20 volt capability, model DMS-20PC-2RH manufactured by Datel. Amp 178 and gain resistor 180 scale the PWM signal from microprocessor 104 to make the volt meter represent the "gallons per minute" flowing through the selected sensor 150, 152.

Microprocessor 104 uses the "supply g.p.m." or "return g.p.m." LEDs in display 24 to tell the user which flow sensor 150 or 152 is currently represented on the digital flow meter 22. A "flow not equal" LED is illuminated when unsealed S–R exceeds threshold T. LEDs labeled "low supply flow" or "low return flow" are lit when either sensor 150, 152 indicates flow is less than 1 g.p.m. Similarly, "high supply flow" or "high return flow" LEDs will light when either sensor 150, 152 indicates flow is more than 7 g.p.m. Microprocessor 104 will allow brief, intermittent faults caused by harmless conditions such as water hammering, pressure glitches, and rugged actual factory situations. However, the "stop LED" will turn on if any of the above conditions occur for a full two seconds. This fault condition will turn the coolant valve off, as described below.

In Output module 183, power is supplied to the system over a 4-pin connector 184. Wire 186 is chassis ground, wire 188 is hot, and wire 190 is common. Wire 192 performs a dual purpose: when wire 192 is attached to a robot control input relay, it will tell the robot when coolant is flowing when high; when wire 192 is off, coolant is off, and a call to maintenance signal will be made. Wire 192 should also be attached to a robot output relay. When briefly energized, the coolant valve 40 will be turned on and flow restored.

Mechanical relay 194 is normally on and is driven directly by microprocessor 104. Relay 194 provides power to the coolant solenoid 40 to keep it open. If a fault condition occurs, relay 194 opens and turns off solenoid valve 40. Momentary push button switch 196 temporarily provides power to solenoid valve 40 to allow water to flow again. If microprocessor is satisfied that the problem has been solved, relay 194 stays closed to keep the valve 40 on when the user releases switch 196. Preferably, a light in switch 196 indicates to the user that the valve is operating properly. If there is a major circuit malfunction, the user may toggle locking override switch 198 to turn valve 40 on permanently and bypass system 10. As shown in FIGS. 1 and 2, push button switch 196 has a button 18 extending from housing 14, and override switch 198 has a toggle 16 extending from the housing 14.

Optoisolator 200 watches the status of coolant solenoid valve 40 and reports it to the microprocessor 104. When the user or robot attempts to restart coolant flow, the microprocessor 104 will give the flow sensors 150, 152 "another chance" and will compare their values to see if a restart is justified. Microprocessor 104 will ignore a restart unless optoisolator 200 says to give another chance. After a shut down, microprocessor 104 will not inadvertently latch valve 40 on again unless the robot or user intentionally intends it by electrically turning valve 40 on.

In operation, leaks typically occur when a coolant line breaks or a welding gun tip breaks off. The shut-off valves currently in use employ mechanical or electronic means to measure the coolant flow to a welding gun. If shop water pressure changes, grunge builds up in welding gun tips or valves, hoses are not properly dressed for minimal flow restrictions, adjacent robots cause flow changes or a myriad of other problems occur, these prior art shut-off systems fail. The failure of prior art systems is mainly attributed to the fact that they only measure flow or coolant to the gun and jam under realistic dirty water conditions. The shut-off valve is typically "hair" triggered to shut-off water with about plus or minus 20% of the flow.

An alternate embodiment apparatus 210 has generally the same setup and configuration as that described above. However, there are some differences which will be described, such as a modular electrical connector 202 which is capable of being changed in the field and completely unplugged from the system and replaced depending on the needs of the welding environment. The alternate embodiment apparatus 210 also includes user friendly buttons to reset 212 the apparatus, setup 214 the apparatus, enter 216 the apparatus, auto calibrate 218 the apparatus, review the history 220 of water flow conditions and leaks of the apparatus since initialization, and to select 222 various features such as gallons per minute flow, liters per minute flow, trigger points for low flow alarms, and the such.

In the alternate embodiment water saver system the manifold 224 is machined to include a supply passageway 226 and return passageway 228. The water saver system measures the flow of water to and from the device being cooled, in this case an automated welding gun or guns, using two paddle wheel rotors 230, 232. The two rotors 230, 232 are mounted in the brass manifold 224 and sealed with a plastic lid 234 and an o-ring seal 236. Each of the rotors preferably have eight legs and they are radially magnetized. It should be noted that the rotors may also be made of plastiform, which has magnetic grains that are magnetized after being injection molded. Furthermore, an alternate embodiment would have each rotor arm made of plastic and having magnets embedded or secured by glue or other means into the ends to achieve the same results. To monitor the flow a hall effect sensor 238 is embedded within the brass manifold 224 such that it senses each rotor leg as it passes by the hall effect sensor 238. The hall effect sensors 238 will output a square wave from approximately 0 to 200 Hz as the water flow increases from 0 to 10 gallons per minute. The apparatus includes two LEDs 240, 242 which are mounted on the outside of the system and are used to monitor the rotor operation and will flash as the rotors turn. The frequency of the rotor 230, 232 turning is virtually linear as the flow rate increases.

The rotors are constantly being monitored by a microprocessor 244. The hall effect sensors 238 square wave output is directly connected to the microprocessor 244 which counts the number of pulses from each hall effect sensor 238 within a predetermined time frame. In the preferred embodiment each sensor 238 is approximately sampled three times per second. A "watch dog" timer is included in the microprocessor 244 and will cause an internal interrupt at precise intervals of approximately one third of a second. With the interrupt occurring approximately three times per second a software flag will instruct the microprocessor that the total number of counts should be sampled soon and the gallons per minute determined in the supply and return tubes. An interrupt is used to determine the flow rate to ensure that the computer is not busy executing a lengthy interrupt routine which could cause a lock out of the microprocessor during a critical power down interrupt routine. Therefore, the flow is determined in a regular subroutine which allows a power interrupt flag to get immediate attention any time during such subroutine. To determine the gallons per minute the flow routine subroutine will sample the computer counter 246 which is the supply flow and 248 which is the return flow and store their values on the chip. The counters are then cleared to allow new pulses to come through. In the preferred embodiment the counter values typically range from 15 to 150 decimal depending on the flow rate and normally the value of 246 and 248 are slightly different which is accounted for in the calibration process of the microprocessor unit.

The power module 202 is connected to a single circuit board and may be used for either 24 volts DC or 120 volts AC The connection is created by a 16 pin header connector which accesses key circuit points which are voltage specific. In the case of a 120 volt AC power the voltage will enter through pins 1 and 2 with pin 1 passing through a fuse 250 before going into the power suppression and step down power transformer 252. Capacitor 254 will suppress any high frequency power surges by creating a lower impedance across the power wires during high frequency transients. Furthermore, the voltage is clamped by metal oxide varistor (MOV) 256 to keep spikes from being generated greater than 150 volts AC. Next the voltage is stepped down by transformer 252 and then it is rectified using a full wave bridge rectifier 258. The output of the transformer 252 feeds into zener diode 260 which clamps the voltage less than 30 volts and capacitor 262 which smooths the power output of the full wave bridge rectifier 258.

The system is also capable of operating 24 volt DC applications if necessary. The power enters after the bridge rectifier 258 and is clamped under 30 volts by the zenerdiode 260 and smoothed by capacitor 262. Then the power is fed to a power trans PT5101-ND DC/DC convertor or any other similar voltage convertor which is a high frequency switching power supply that converts the DC voltage to 5 volts DC to run virtually the entire circuit.

The microprocessor 244 has internal ROM and RAM but in the event of a power loss the parameters programed by the user must be stored. Storage of such parameters is accomplished by reducing and turning off most functions of the computer except for the RAM until power is restored. Two one fared capacitors 264 provide the necessary energy, approximately one month of battery backup, to the computer in case of power loss. The capacitors 264 are used instead of batteries because they do not need to be replaced after years or months of use. The diode 266 keeps the capacitors 264 voltage from feeding the rest of the circuit while the power is off. It should also be known that the microprocessor 244 which is a Philips P87C5570EV has a power down mode. When a specific power down bit is set the internal RAM registers will shut down all counters, interrupts, I/O and the clock to use the minimum amount of power possible. When the power is restored and the computer is reset the computer will exit the power down mode. The circuit has been designed to give as much advanced notice of the pending power loss to the microprocessor 244 as possible by the use of a power detector chip 268 which will send a signal to the computer when power dips below 4.9 volt DC from the normal 5 volt DC voltage of the circuit. A low signal from the power detector chip 268 executes an interrupt in the microprocessor of the highest possible priority. An interrupt will cause the execution of a subroutine which sets the power down bit. Once the power down bit is set the computer will use approximately 4 microamps of power to keep the RAM backed up.

The microprocessor 244 will execute a calibration process based on the values of timers $T_2$ and $T_3$ because there is an inherent difference between the rotation rate of the supply and return rotors of a few percent. An objective of the water saver system is to detect several differences between the supply and return flow rates which leads to the conclusion that rotation rates must be scaled identically. This is accomplished using an auto calibration procedure which is started by pressing the calibration button 218 on the front panel of the water saver apparatus or by the microprocessor itself after the user chances the units of measure or the manifold sizing on the unit. During the calibration of the device it must be determined what the actual flow of the unit is likely to be so that external means such as an auxiliary external flow sensor does not have to be used to scale the unit. Furthermore, the unit must scale the two sensor readings to be identical to reliably determine when a leak has occurred or low flow conditions are occurring. A predetermined orifice size of the manifold 224 will create a predictable rotor speed and thus frequency to the microprocessor 244. As an example, a rotor speed of 30 counts per sample for a ¾ inch NPT manifold corresponds approximately to 4 gallons per minute while 60 counts would correspond to 8 gallons per minute for the same manifold. Whereas if a ⅜ inch MPT manifold had a rotor speed of 30 counts per sample that corresponds to approximately 2 gallons per minute. The user defined orifice size in the setup of the unit makes it straight forward to determine the actual flow by taking a simple reading of the counts of the sample and multiplying it by a constant K. Then to get the sensors to exactly match each other a sensor reading is taken during the calibration process. This value is used on each of the subsequent flow readings. The calibration routine makes the following determinations: the supply flow $T_2$, to the return flow $T_3$ if a ⅜ inch manifold is being used and if it is used in gallons per minute or liters per minute, if a ¾ inch manifold is being used and if it is used in gallons per minute or liters per minute units. Then a scale number F is determined by taking the supply flow times the constant K divided by 100. These values are then saved until the next time the auto calibration routine is executed. Soon after each sampling of the flow sensors, which are monitored three times per second, the actual flow rate in the desired units by the user can be displayed using the following equations; supply flow=$T_2 \times F$/supply 0. The return flow=$T_3 \times F$/return 0. These equations will give the actual instantaneous flow and is used in all determinations of low and unequal flow conditions. These values will also be outputted to a LCD display at frequent intervals. It should be noted that the supply zero and return zero essentially cancel out the fact that one sensor may run 8% slower than the other. The constant F is the scaling factor to scale the raw sensor counts to actual engineering units of flow.

The display used on the apparatus or unit is a mechanical lid 270 which protects the circuit from the harsh environment and houses the key pad, liquid crystal display 272 and LED lights. The LCD is a two line by 16 character display preferably from Shelly having number SSM21686HGB-GS. It should be noted that a larger display may be used that includes more lines and characters if such features are needed such as more in depth help, spare parts information, customer support, diagnostics or other screens. Data is sent to the display in parallel over Port $P_0$ 274 of the microprocessor computer 244. An enable line from the computer and character command signal is used to properly clock data into the display. The LCD has LED back lighting for use in dim lighting where the contrast is adjusted by varying the intensity of the back lighting via resistor 276.

Figure 15A:
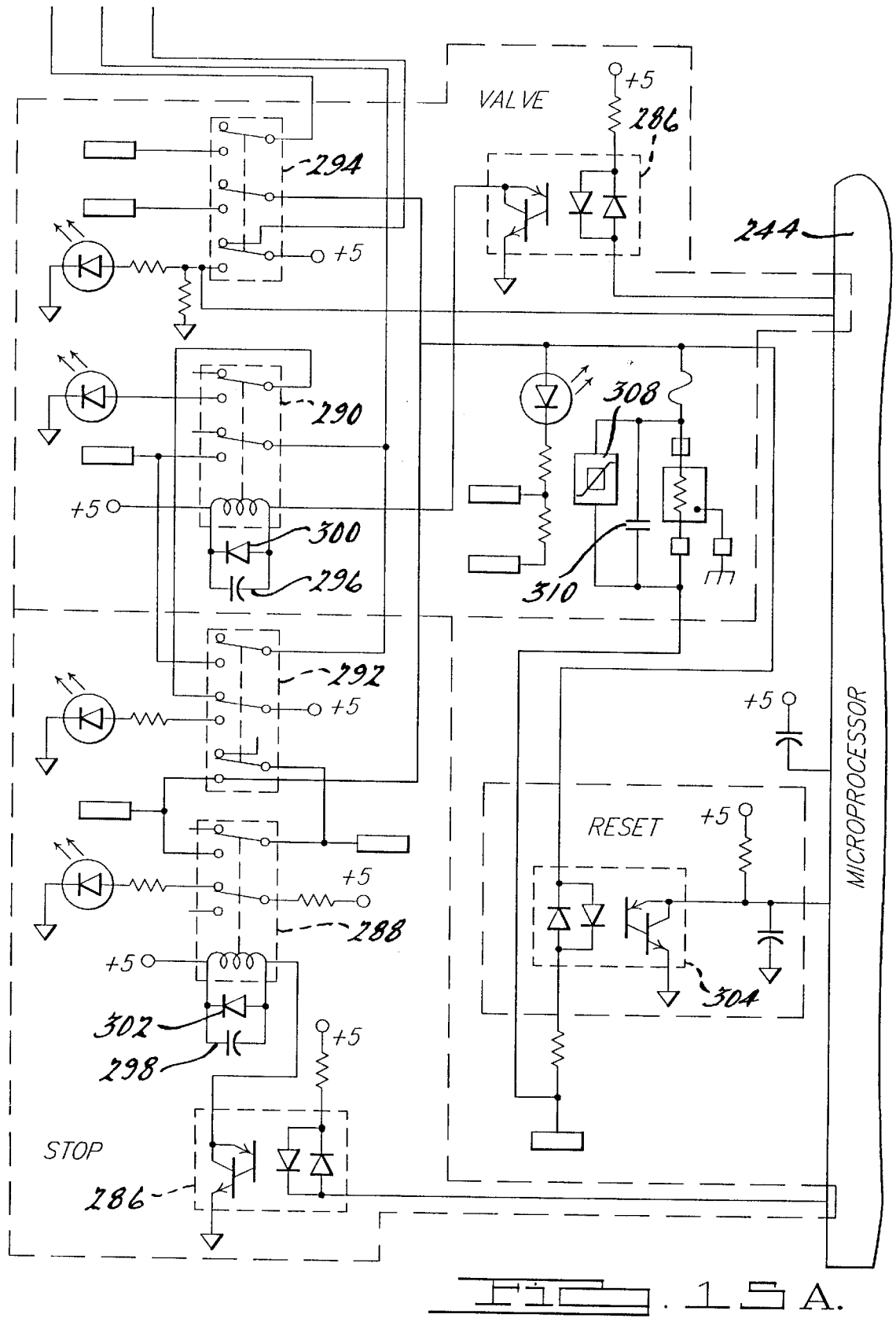
FIGS. 15 A, B, C, are a circuit schematic of the alternate embodiment.
Figure 15B:
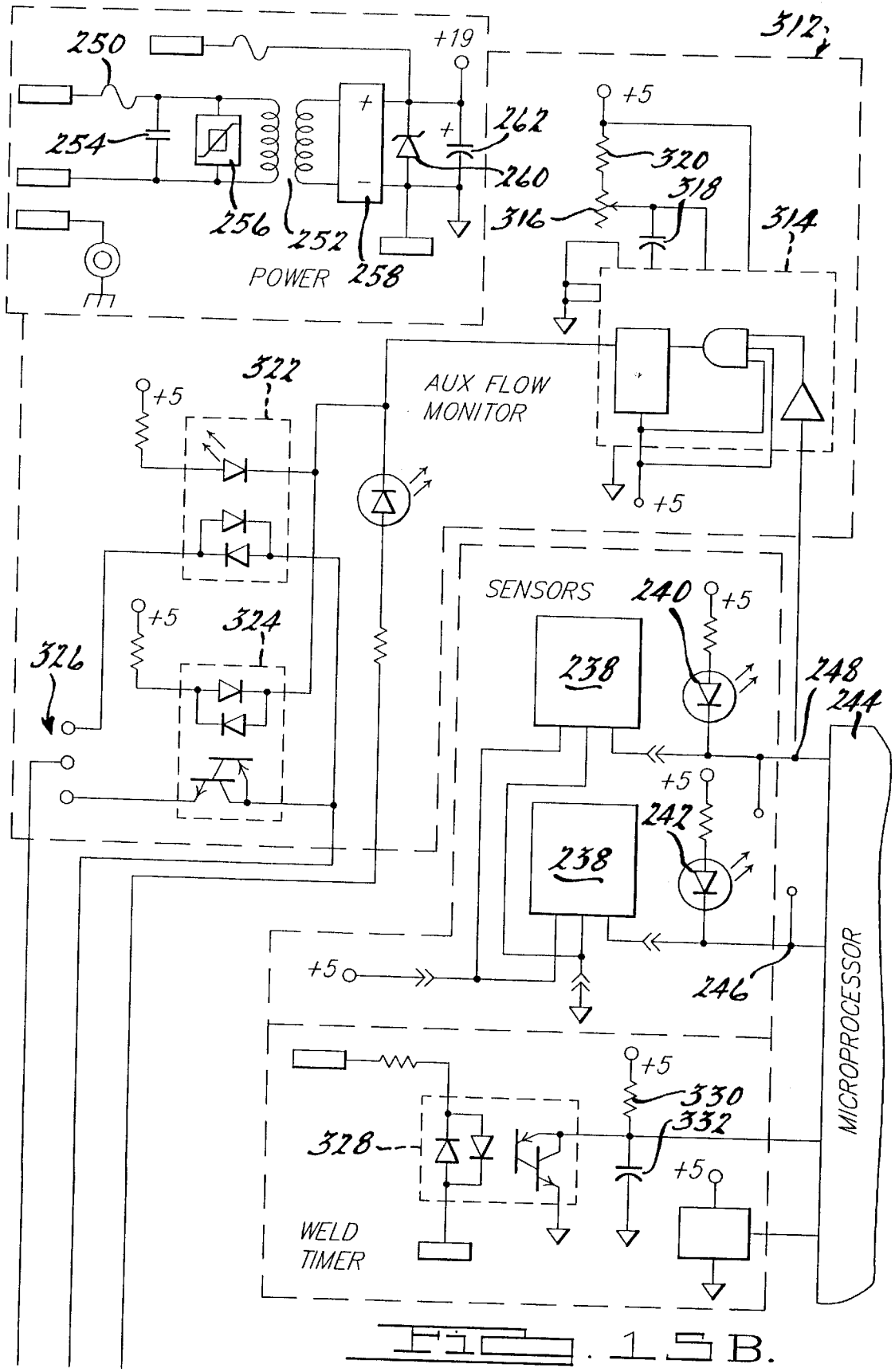
Figure 15C:
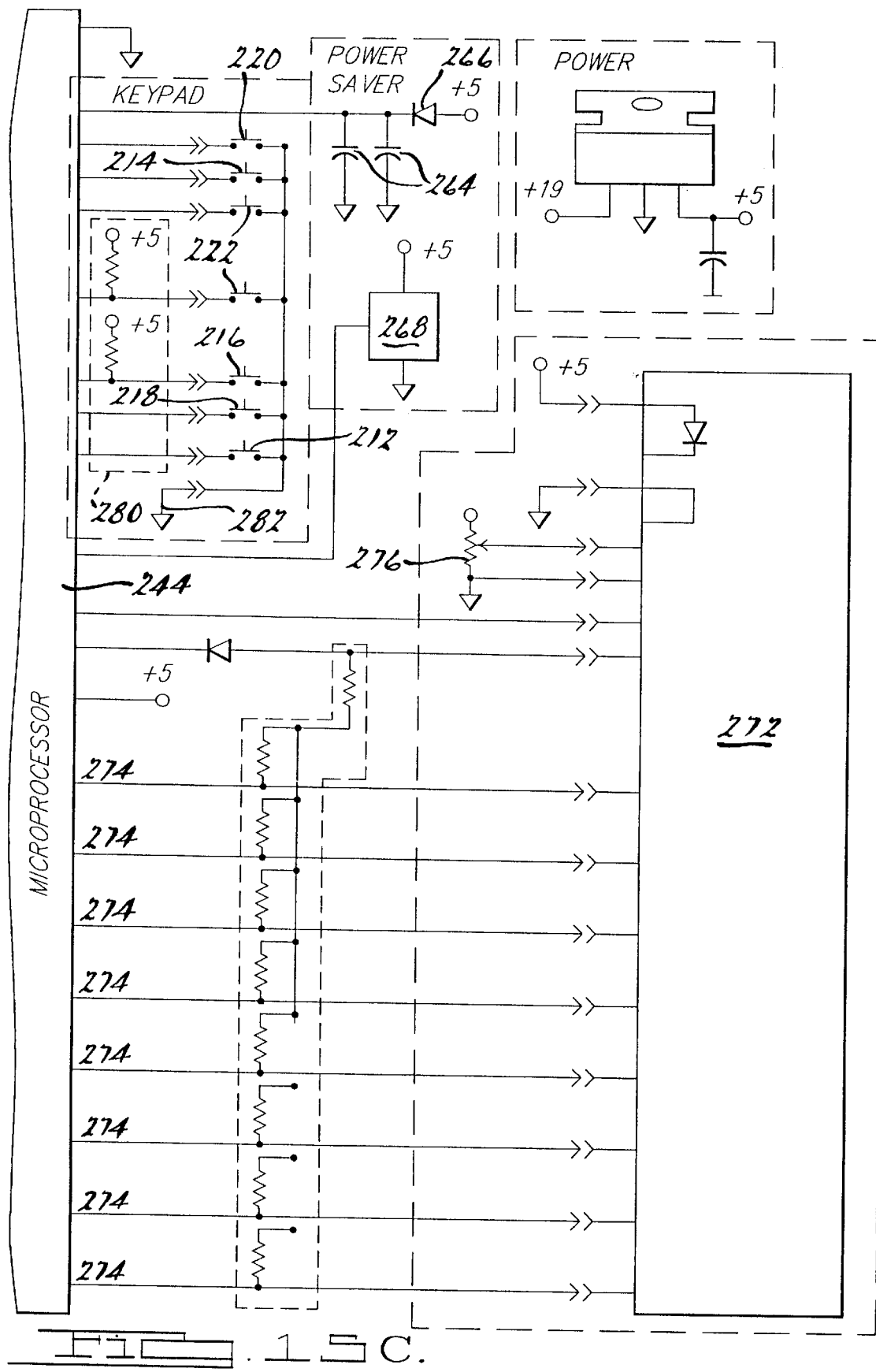
Figure 16A:
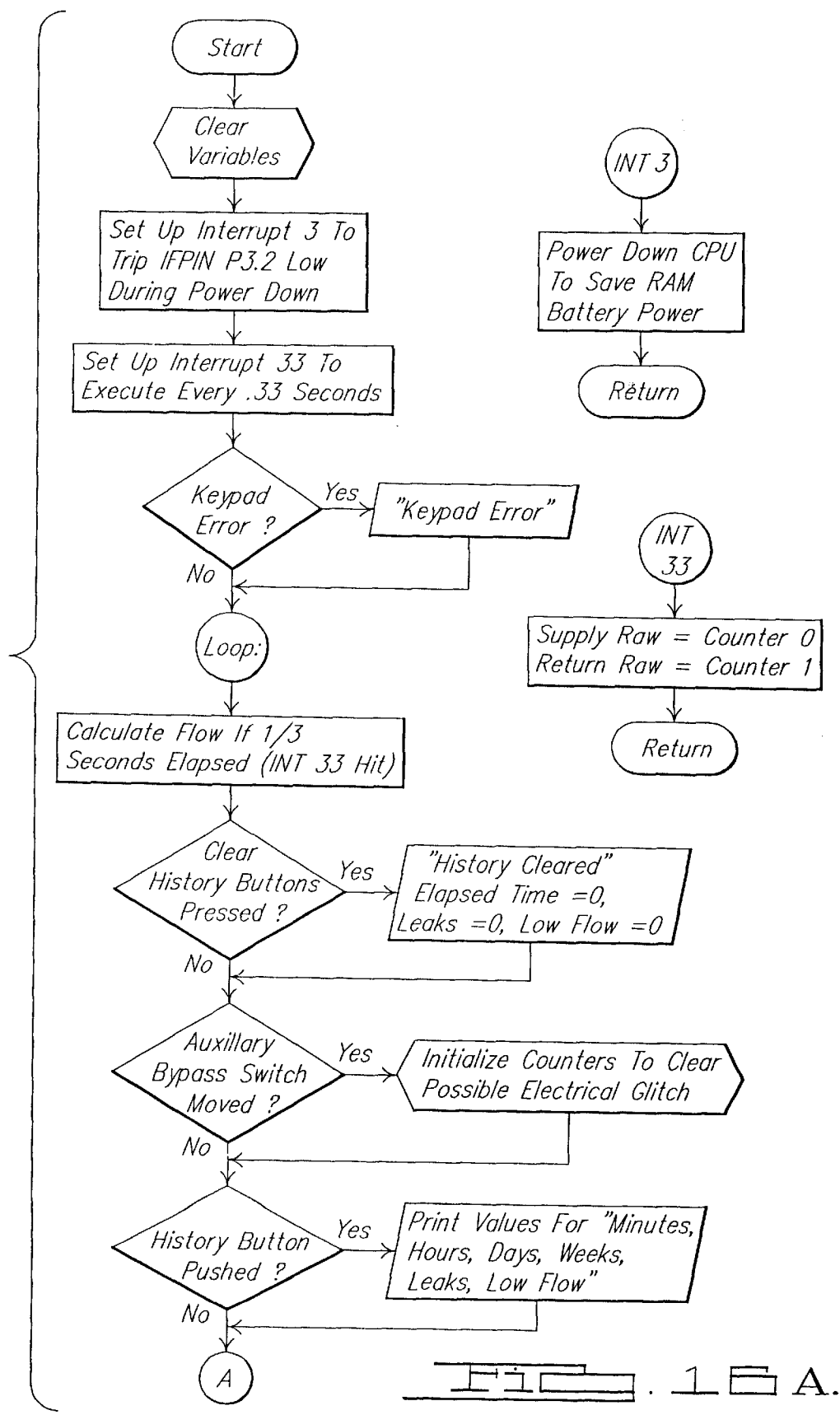
FIGS. 16 A, B, C, D, E are a flow chart of a methodology for the alternate embodiment.
Figure 16B:
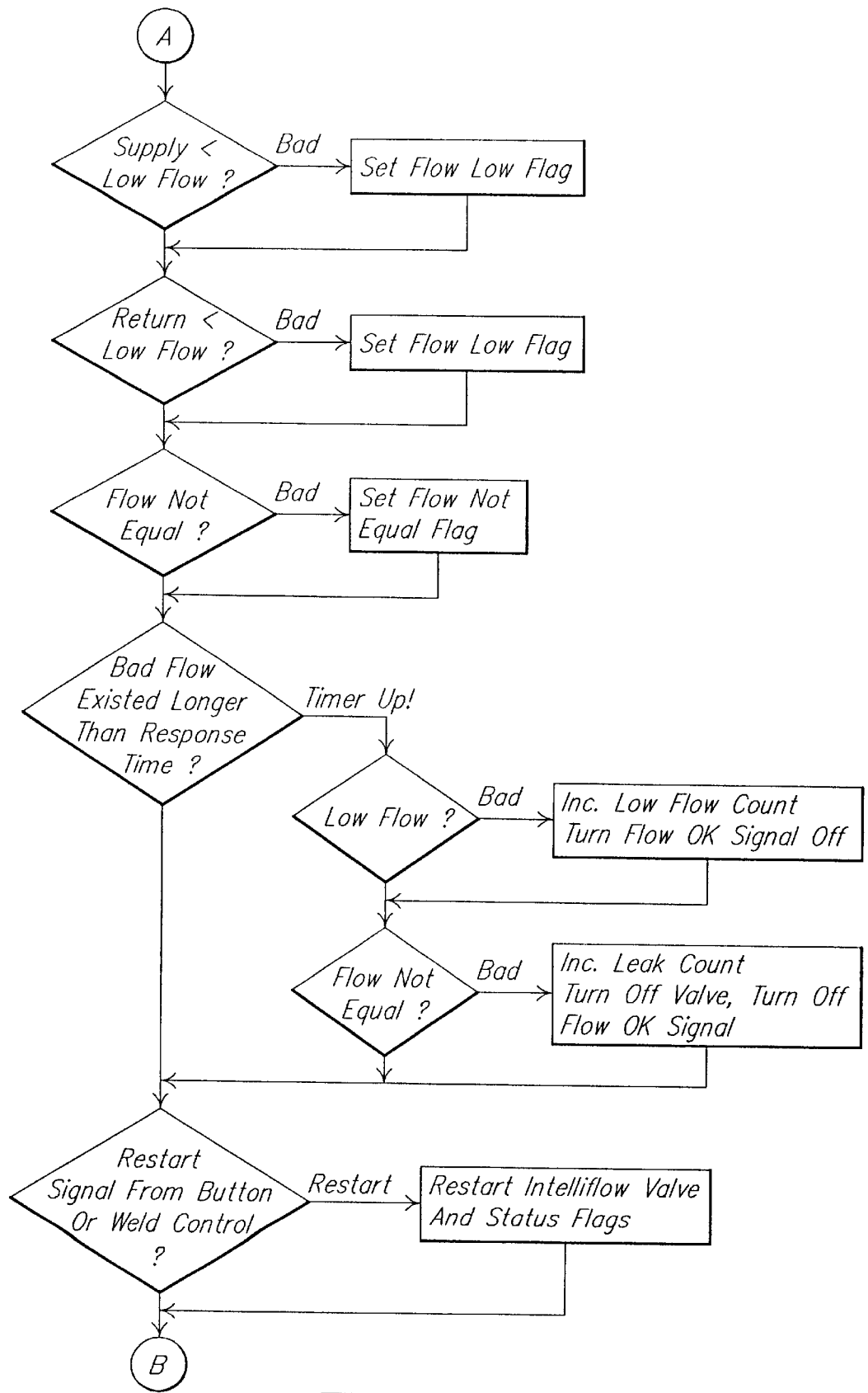
Figure 16C:
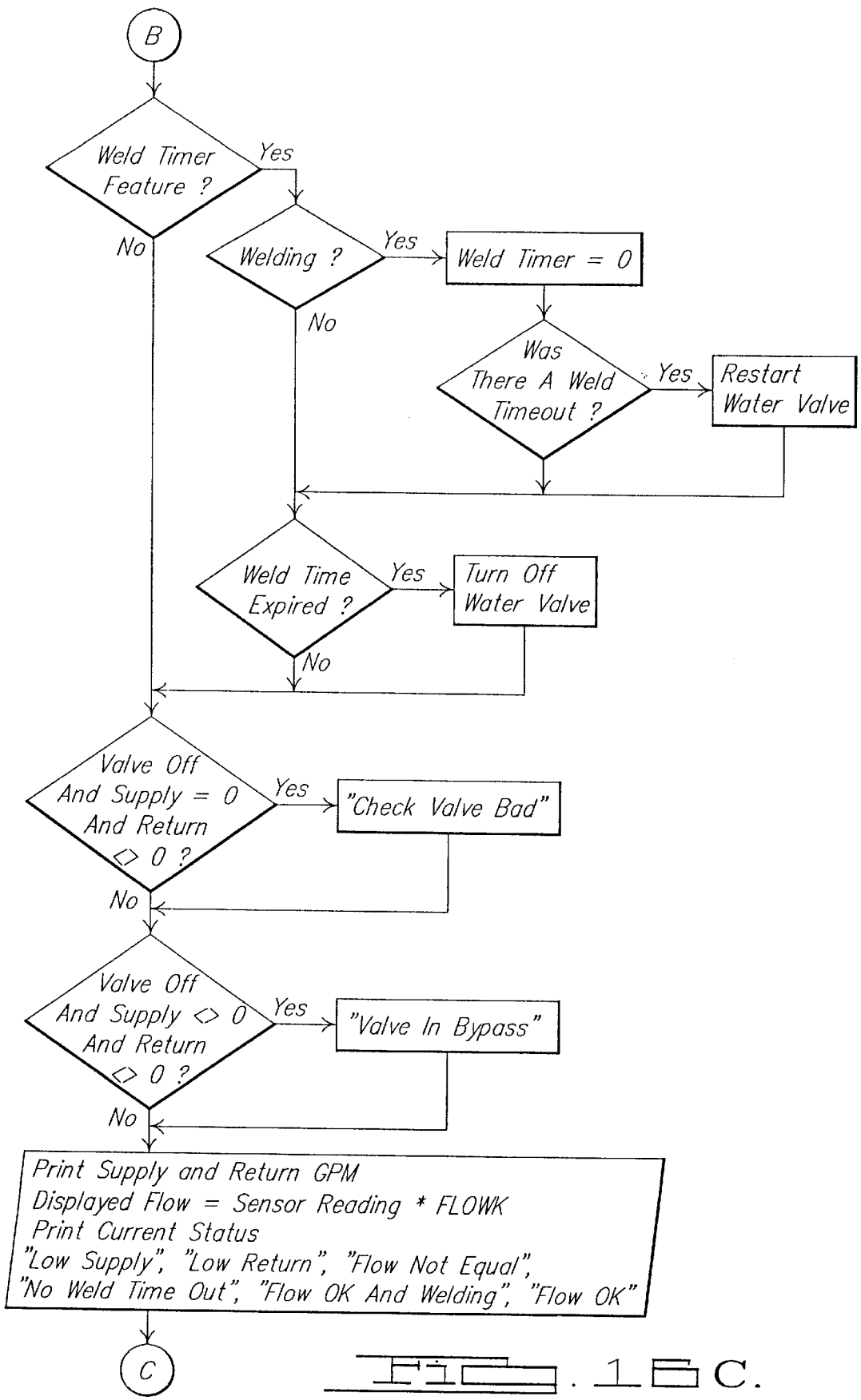
Figure 18D:
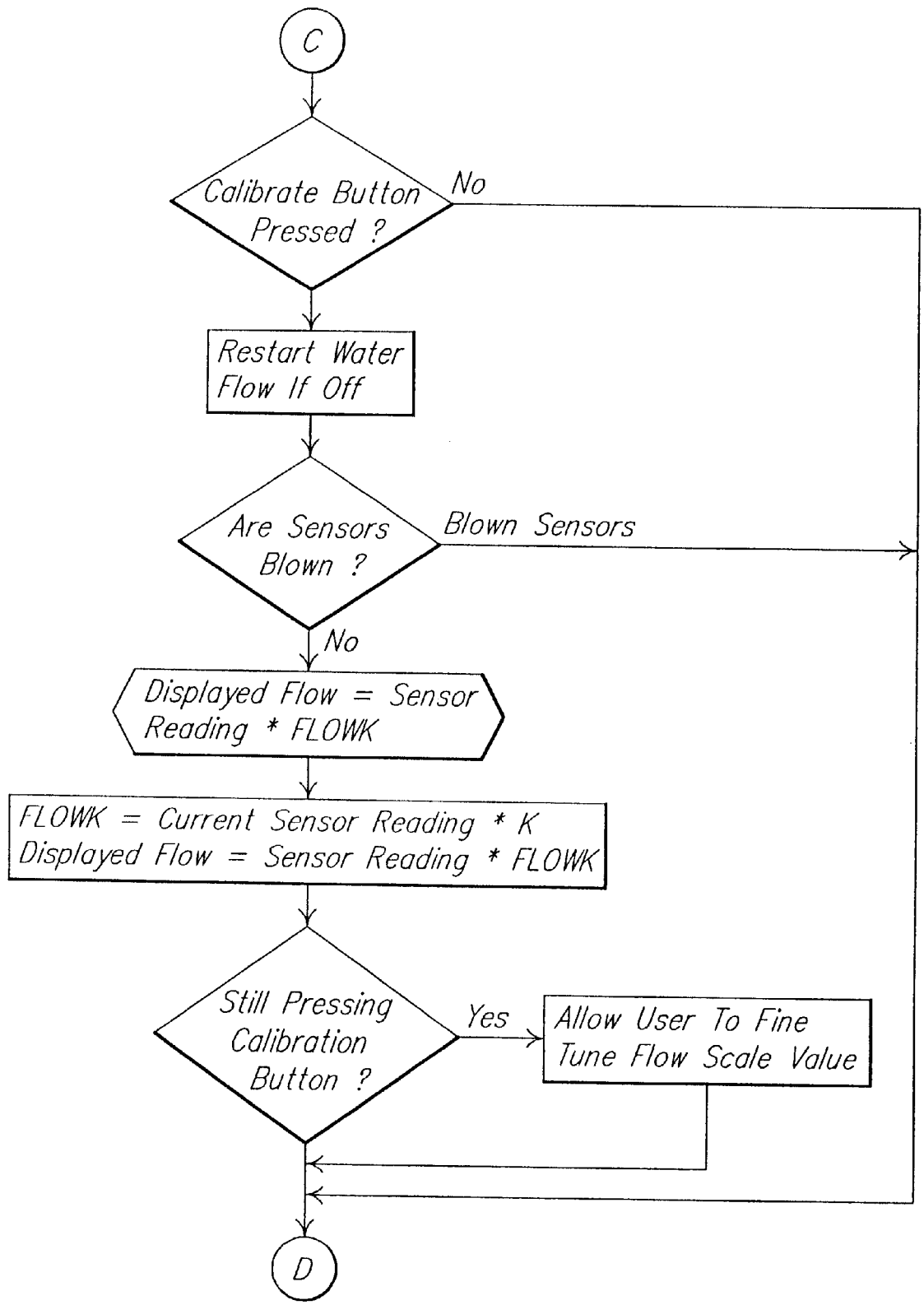

The key pad 278 is used to control the unit and has membrane push buttons directly attached to the lid which are then directly attached lo the computer 244. The push buttons will pull the computer input lines low when pressed. It should be noted that most of the buttons are electrically pulled high by pull-up resistors in the computer. As shown in the FIGS. 15A–B some pins on Port $P_1$ without internal pull-up resistors require external pull-up resistors 280. The lid is connected to the circuit board with ribbon connectors 282 and 284.

The system also includes two output signals from the computer interface to the welding environment. One is the valve signal the other is the stop signal. These signals are isolated from mechanical relays through optoisolators 286. Relays 288 and 290 connect to the user signals. Switches 292 and 294 bypass the relays 288 and 290 for operation and bypass mode. In the bypass mode the valve will be turned on and the flow O.K. signal will be sent to the weld control system. The capacitors 296, 298 and diodes 300, 302 surpress spikes when the relay changes state. It should be noted that whenever the relay changes state a power spike reaches the computer which can cause the rotor counters to fail. The software will reinitialize the counters and interrupts after commanding a relay to change state so no apparent lock up condition appears to the user.

The unit can be commanded to perform a water flow restart by pressing the reset button on the front panel of the unit. It should also be noted that the external reset signal from the weld control can tell the computer to restart water flow via optoisolator 304. This in turn will have the software turn the valve 306 on for four seconds to try to reestablish water flow. A new fault condition will be evaluated after this four second period elapses. The water valve is supplied power by relay 290 as operated by the computer. While there is no leak condition 290 will be on with the valve. However if a leak occurs, relay 290 will turn off which in turn will turn the valve off. A suppression metal oxide varistor 308 and capacitor 310 suppress inductive power spikes from reaching the computer 244 via the water valve.

The water saver system also can track the history of the unit. History can be reviewed by the user by depressing a button 220 on the lid which will quickly determine the age of the unit, the number of leaks, and low flow conditions that have occurred since initialization of the system. The history counters can be restored to zero by pressing three keys simultaneously on the key pad. The history button is also very useful in identifying problem robots in a multi-robot environment. The computer generates interrupts at 3 Hz in the system. The counters in the unit count the number of interrupts to determine minutes, hours, days and weeks. These numbers are displayed first after the history button is pressed, after a brief delay, the leak and low flow condition counters are next displayed. The counters are incremented whenever an occurrence first occurs. Additional counters for more specific conditions could be added such as when the unit was adjusted, up time, weld count and a variety of other information.

An additional counter is used to measure the temperature of the coolant in the return line. A temperature sensor IC 334, preferably a Dallas Semiconductor DS1620 or DS1820, is embedded upside down in the manifold 224 near the return coolant flow. A thermal transfer grease is used in conjunction with the chip to transfer the coolant temperature to the sensor 334. The sensor is directly connected to the microprocessor 244. The microprocessor 244 then can execute an instruction to display the coolant temperature in real time on the LED. The microprocessor 244 will have user set trip points for the sensor 334. Welding will stop if the trip points are reached, which indicates the coolant temperature is too high or too low. DS1820 "single wire" temperature sensors can be strung in series like 'Christmas lights'. Temperature sensors could potentially be strung throughout the welding robot cell at critical locations for total monitoring. Individual thresholds at each sensor could be set.

Another feature of the alternate embodiment unit is the use of an onboard auxiliary circuit 312. The auxiliary circuit 312 is used to make certain that water is flowing even if the main water saver fails and the primary circuit has been placed in a bypass made. However, without such monitoring it is easy for an accident to happen and the robot operated without any water flow. This would lead to problems such as expensive cables being burned up and other catastrophes of the robot arm. The onboard auxiliary sensor 238 removes the need and use of an external auxiliary sensor. The auxiliary circuit 312 is wired in series with the main circuit in the unit and relies only on the power section of the main circuit board and the rotation of the return rotor. The auxiliary circuit is used to detect low flow conditions only it is not used to detect leaks. The intention being to determine which cable would be damaged by low flow of the coolant. However, both the main and auxiliary circuit can be placed in bypass using separate mechanical switches. The rotors will output a square wave from 0 to 200 Hz depending upon water flow in each of the pipes. A one shot multivibrator 314 is used to determine when the rotation speed is too low by opening a signal when the frequency drops below a desired level. The multivibrator 314 acts like a delay off switch. As long as the rotor rotation is getting pulses and the multivibrator 314 is getting retriggered the out put of 314 will be positive. The trigger is sent directly from the return rotor hall effect sensor and is the same one hooked up to the microprocessor. However, if the triggers are not arriving quickly enough, 314 will time out before the trigger occurs and the output of 314 will begin to oscillate. The timing for the circuit is done by an RC circuit which is internal to 314 and is also comprised of resistor 316 and capacitor 318. Resister 320 keeps the value of 316 from being adjusted so low that it damages 314. By changing the value of resistor 316 you can extend the on time of 314 to allow for varying trigger frequencies and thus flow. An auxiliary flow okay light 242 will flash on the lid of the unit as flow decreases until it remains off. This flashing signal will be sent to the robot control through optoisolators 322 and 324. Optoisolator 322 has a TRIAC output for 120 volt "flow O.K." signals and optoisolator 324 has a Darlington output for 24 volt DC "flow O.K." signals. The user will be able to select if the output is to be 24 volts DC or 120 volts AC by selecting switch 326.

The unit has also been designed with a welding water saver feature that will automatically shut off the water supply if there is no activity for a certain period of time on the welding guns. The time allowed during periods of activity can vary from 0 to 255 minutes and is field settable. The default setting for this feature sets the weld timer to zero. A separate signal from the weld control will instruct the water saver when a weld is being made through an optical isolator 328 to the microprocessor. Resistor 330 and capacitor 332 will smooth out the ripple which will occur in 60 Hz AC applications. Thereafter, every time a weld occurs, the weld timer is reset to zero. The weld timer acts as a clock which is always trying to increment as time elapses but is frequently being set to zero as a weld occurs on the weld gun. If no activity is occurring on the weld gun the weld timer will exceed the allowed time and the water will shut off automatically. However, when welding resumes the water saver will automatically restart. It should be noted that a true leak condition will lock out the weld timer and disable the restart from the weld timer signal. It should also be noted that leak detection in normal operation will shut off the solenoid to stop water flow. However, it should be noted that the continued rotation of the supply sensor would indicate that the solenoid valve is in the manual bypass mode. The user would then have to check that the solenoid valve is not in any bypass if the "Leak. Valve in Manual Bypass" error is shown on the screen or the leak detection would not be able to shut off the water if necessary.

The present invention differs from the prior art in that flow is measured both to and from the welding gun, and the difference is compared to a preset leak threshold. Thus, the system is isolated from nonleak-related changes such as shop water pressure changes, which affect both supply and return flow rates. As a result, not only are false alarm shut-offs avoided, but the system monitors leakage throughout the entire cooling system due to an increased accuracy.

Whereas, the present invention has been described with respect to a specific embodiment thereof, it will be understood that various changes and modifications will be suggested to one skilled in the art and it is intended to encompass such changes and modifications as fall within the scope of the appended claims.

What is claimed is:

1. In an automated welding machine, where a flow of liquid coolant is supplied to welding components on the machine from a source of coolant and then returned to the source of coolant, the improvement comprising:

a supply sensor for measuring the supply flow rate of coolant in a supply coolant line to welding components;

a return sensor for measuring the return flow rate of coolant in a return coolant line from the welding components;

a microprocessor adapted to compare the supply flow rate and return flow rate and detect differences between said two rates, said microprocessor adapted to compare the detected differences to a leak threshold value, and said microprocessor adapted to generate a valve shut-off signal in the event a detected difference in flow rates exceeds the leak threshold value;

a valve in the supply coolant line responsive to the valve shut-off signal to shut off the flow of coolant in response thereto;

a history button, said history button including a count of the time said welding machine has been on and a count of any leaks and low flow conditions since initialization; and a modular electrical enclosure and an electrical sensor assembly.

2. In an automated welding machine, where a flow of liquid coolant is supplied to welding components on the machine from a source of coolant and then returned to the source of coolant, the improvement comprising:

a supply sensor for measuring the supply flow rate of coolant in a supply coolant line to welding components;

a return sensor for measuring the return flow rate of coolant in a return coolant line from the welding components;

a microprocessor adapted to compare the supply flow rate and return flow rate and detect differences between said two rates, said microprocessor adapted to compare the detected differences to a leak threshold value, and said microprocessor adapted to generate a valve shut-off signal in the event a detected difference in flow rates exceeds the leak threshold value;

a valve in the supply coolant line responsive to the valve shut-off signal to shut off the flow of coolant in response thereto;

a calibration circuit for auto zeroing the microprocessor to compensate for sensor drifts over time; and a modular electrical enclosure and an electrical sensor assembly.

3. In an automated welding machine, where a flow of liquid coolant is supplied to welding components on the machine from a source of coolant and then return to the source of coolant, the improvement comprising:

a supply sensor for measuring the supply flow rate of coolant in a supply coolant line to welding components;

a return sensor for measuring the return flow rate of coolant in a return coolant line from the welding components;

a microprocessor adapted to compare the supply flow rate and return flow rate and detect differences between said two rates, said microprocessor adapted to compare the detected differences to a leak threshold value, and said microprocessor adapted to generate a valve shut-off signal in the event of a detected difference in flow rates exceeds the leak threshold value;

a valve in the supply coolant line responsive to the valve shut-off signal to shut off the flow of coolant in response thereto;

an internal auxiliary flow monitor, said flow monitor using a separate circuit to monitor the flow; and a modular electrical enclosure and an electrical sensor assembly.

4. The improvement of claim 3 wherein said auxiliary flow monitor is hard wired in series with a main circuit, said flow monitor being a self standing unit.

5. In an automated welding machine, where a flow of liquid coolant is supplied to welding components on the machine from a source of coolant and then returned to the source of coolant the improvement comprising:

a supply sensor for measuring the supply flow rate of coolant in a supply coolant line to welding components;

a return sensor for measuring the return flow rate of coolant in a return coolant line from the welding components;

a microprocessor adapted to compare the supply flow rate and return flow rate and detect differences between said two rates, said microprocessor adapted to compare the detected differences to a leak threshold value, and said microprocessor adapted to generate a valve shut-off signal in the event a detected difference in flow rates exceeds the leak threshold value;

a valve in the supply coolant line responsive to the valve shut-off signal to shut off the flow of coolant in response thereto;

a temperature sensor located near said coolant line; and a modular electrical enclosure and an electrical sensor assembly.

6. The improvement of claim 5 wherein several temperature sensors in series are addressed from a single water saver unit.

7. In an automated welding machine, where a flow of liquid coolant is supplied to welding components on the machine from a source of coolant and then returned to the source of coolant, the improvement comprising:

a supply sensor for measuring the supply flow rate of coolant in a supply coolant line to welding components;

a return sensor for measuring the return flow rate of coolant and a return coolant line from the welding components;

a microprocessor located within a water saver unit adapted to compare the supply flow rate and return flow rate and detect differences between said two rates, a microprocessor adapted to compare the detected differences to a leak threshold value, and the microprocessor adapted to generate a valve shut-off signal in the event of a detected difference in flow rates exceeds the leak threshold value;

a weld timer circuit for shutting off water after a predetermined period of inactivity;

a modular power and valve cord component including a rapid change connector;

a history circuit capable of counting amount of time unit has been on and counting number of leaks and low flow conditions;

a calibration circuit for auto zeroing; and an internal auxiliary flow monitor unit said auxiliary flow monitor unit using a separate circuit independent from a water saver main circuit.

8. The improvement of claim 7 wherein the microprocessor is adapted at taking a supply and return flow rate which will calibrate the sensors to be identical.

9. The improvement of claim 7 wherein the microprocessor is adapted to take an actual reading, said reading used to determine an actual flow rate in engineering units as chosen by a user.

10. The improvement of claim 7 wherein the microprocessor is adapted to determine a check valve error by sensing flow through the return rotor and absence of flow through the supply rotor.

11. The improvement of claim 7 wherein the microprocessor is adapted to determine valve bypass if the computer sends a valve off command but both rotors continue to turn.

12. The improvement of claim 7 wherein the microprocessor is adapted to reset rotor counters during power spikes, said power spikes are determined whenever a toggle switch changes state or a relay changes state.

13. The improvement of claim 7 wherein the microprocessor is adapted to determine if a leak condition exists and to close a solenoid to stop water flow while alerting a user of a manual bypass condition.

14. The improvement of claim 7 wherein the microprocessor is adapted to determine a temperature of said coolant in said return line.

15. The improvement of claim 14 wherein said temperature is determined by a temperature sensor integrated circuit which is located near said return coolant line.

16. In a welding machine, where a flow of liquid coolant is supplied to welding components on the machine from a source of coolant and then returned to the source of coolant, the improvement comprising:

a supply sensor for measuring the supply flow rate of coolant in a supply coolant line to welding components and generating an electrical signal representing the supply flow rate;

a return sensor for measuring the return flow rate of coolant in a return coolant line from the welding components and generating an electrical signal representing the return flow rate;

a microprocessor adapted to compare the supply flow rate to the welding components and return flow rate from the welding components and detect differences between said rates, the microprocessor adapted to compare the differences to a leak threshold value, and the microprocessor adapted to generate a valve shut-off signal in the event a detected difference in said rates exceeds the leak threshold value;

a valve in the coolant line responsive to the valve shut-off signal to shut off flow of coolant in response thereto;

a digital display for indicating at least one of the flow rates; and where the microprocessor delays generation of the valve shut-off signal a predetermined time interval to prevent nuisance shut-offs.

17. In a welding machine, where a flow of liquid coolant is supplied to welding components on the machine from a source of coolant and then returned to the source of coolant, the improvement comprising:

a supply sensor for measuring the supply flow rate of coolant in a supply coolant line to welding components and generating an electrical signal representing the supply flow rate;

a return sensor for measuring the return flow rate of coolant in a return coolant line from the welding components and generating an electrical signal representing the return flow rate;

a microprocessor adapted to compare the supply flow rate to the welding components and return flow rate from the welding components and detect differences between said two rates, the microprocessor adapted to compare the differences to a leak threshold value, and the microprocessor adapted to generate a valve shut-off signal in the event a detected difference in flow rates exceeds the leak threshold value;

a valve in the supply coolant line responsive to the valve shut-off signal to shut-off flow of coolant in response thereto;

where the microprocessor is adapted to compare one of the flow rates to a low threshold value;

a digital display for indicating at least one of the flow rates; and where the microprocessor delays generation of the valve shut-off signal a predetermined time interval to prevent nuisance shut-offs.

18. In a welding machine, where a flow of liquid coolant is supplied to welding components on the machine from a source of coolant and then returned to the source of coolant, the improvement comprising:

a supply sensor for measuring the supply rate of coolant in a supply coolant line to welding components and generating an electrical signal representing the supply rate;

a return sensor for measuring the return rate of coolant in a return coolant line from the welding components and generating an electrical signal representing the return rate;

a microprocessor adapted to compare the supply rate to the welding components and return rate from the welding components and detect differences between said two rates, the microprocessor adapted to compare the differences to a leak threshold value, and the microprocessor adapted to generate a valve shut-off signal in the event a difference in rates exceeds the leak threshold value;

a valve on the coolant line responsive to the valve shut-off signal to shut-off flow of coolant in response thereto;

where the microprocessor is adapted to compare one of the rates to a low threshold value;

where the microprocessor is adapted to compare one of the rates to a high threshold value;

with digital display for indicating at least one of the rates; and where the microprocessor delays generation of the valve shut-off signal a predetermined time interval to prevent nuisance shut-offs.

19. In a welding machine, where a flow of liquid coolant is supplied to welding components on the machine from a source of coolant and then returned to the source of coolant, the improvement comprising:

a supply sensor for measuring the supply flow rate of coolant in a supply coolant line to welding components and generating an electrical signal representing the supply flow rate;

a return sensor for measuring the return flow rate of coolant in a return coolant line from the welding components and generating an electrical signal representing the return flow rate;

a microprocessor adapted to compare the supply flow rate to the welding components and return flow rate from the welding components and detect differences between said two rates, the microprocessor adapted to compare the detected differences to a leak threshold value, and the microprocessor adapted to generate a valve shut-off signal in the event a detected difference in flow rates exceeds the leak threshold value;

a valve in the supply coolant line responsive to the valve shut-off signal to shut-off flow of coolant in response thereto;

where the microprocessor is adapted to compare one of the flow rates to a low threshold value and generate a low flow signal in the event the detected flow rate is less than the low threshold value;

with a digital display for indicating at least one of the flow rates, and where the microprocessor delays generation of the valve shut-off signal a predetermined time interval to prevent nuisance shut-offs.

* * * * *